United States Patent [19]
Yamakoshi et al.

[11] Patent Number: 5,600,501
[45] Date of Patent: Feb. 4, 1997

[54] DISK RECORDING AND/OR REPRODUCING APPARATUS THAT COMPENSATES FOR BIT NONLINEARITY AND A PHASE SHIFT INTRODUCED BY SEPARATE READ AND WRITE HEADS

[75] Inventors: Takamichi Yamakoshi; Nobuhiro Hayashi; Hiroaki Yada, all of Kanagawa, Japan

[73] Assignee: Sony Corporation, Tokyo, Japan

[21] Appl. No.: 531,014

[22] Filed: Sep. 20, 1995

Related U.S. Application Data

[63] Continuation of Ser. No. 156,304, Nov. 23, 1993, abandoned.

[30] Foreign Application Priority Data

Nov. 30, 1992 [JP] Japan .................................. 4-343186

[51] Int. Cl.⁶ ...................................................... G11B 5/09
[52] U.S. Cl. .................................. 360/51; 360/48; 360/62
[58] Field of Search ..................................... 360/51, 77.01, 360/77.06, 77.08, 45, 46, 61, 48, 62; 369/59, 60

[56] References Cited

U.S. PATENT DOCUMENTS

| | | | |
|---|---|---|---|
| 4,918,677 | 4/1990 | Ashinuma et al. | 360/51 |
| 4,964,107 | 10/1990 | Galbraith et al. | 360/51 |

*Primary Examiner*—W. Chris Kim
*Attorney, Agent, or Firm*—Limbach & Limbach L.L.P.

[57] ABSTRACT

There is disclosed a magnetic disk device of the external synchronization system using a head assembly of the recording/reproducing heads separation type. This magnetic device comprises: a reproducing head for reproducing data from a magnetic disk; a clock signal generator for generating a clock signal on the basis of a reproduced signal corresponding to a clock pattern from the reproducing head; a delay circuit for delaying recording data relative to the clock signal generated at the clock signal generator; a recording head for recording the recording data delayed by the delay circuit onto the magnetic disk; a position detecting circuit for detecting head position information (e.g., track number) in a disk radial direction of the recording head on the basis of the reproduced signal from the reproducing head; and a control circuit for controlling a quantity of delay of the delay circuit on the basis of head position information from the position detecting circuit and a predetermined magnetization reversal pattern.

9 Claims, 13 Drawing Sheets

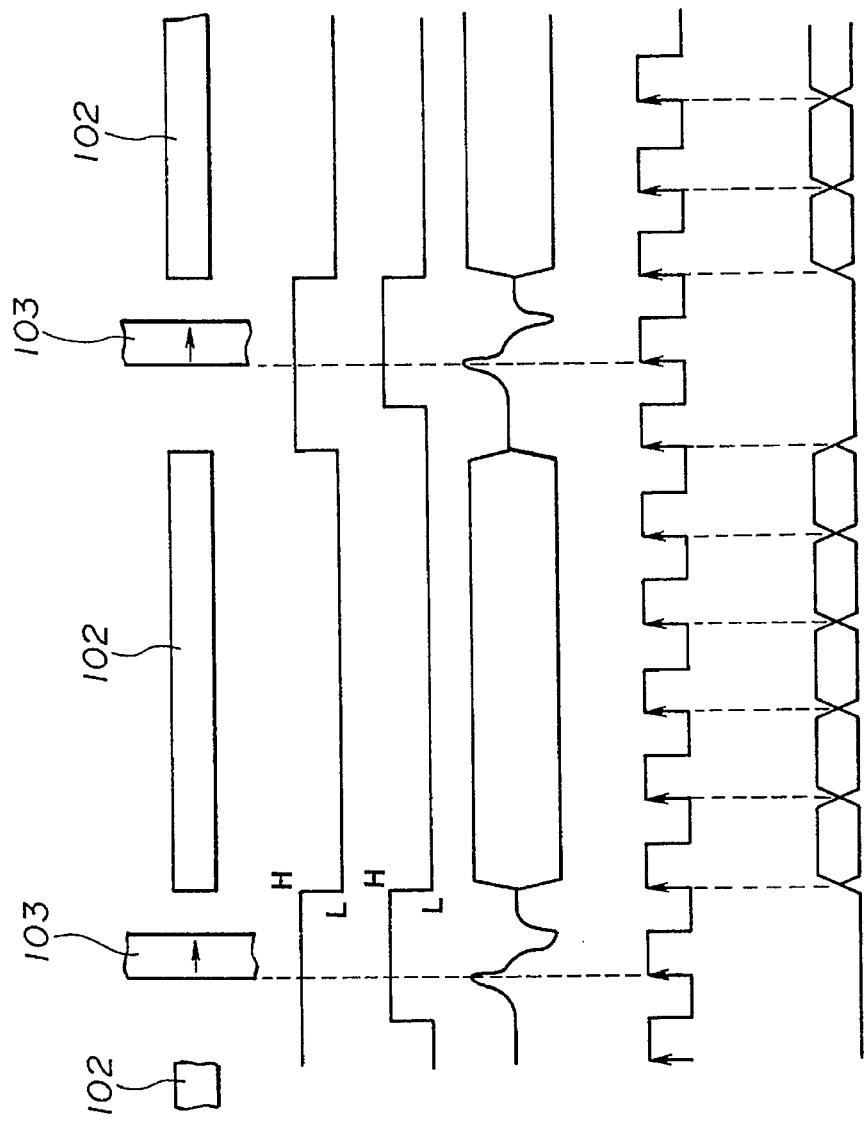
FIG.3(a) TRACK PATTERN
FIG.3(b) SWITCHING SIGNAL
FIG.3(c) CLK. GATE SIGNAL
FIG.3(d) REPRODUCED SIGNAL
FIG.3(e) CLK.
FIG.3(f) RECORDING DATA
PRIOR ART

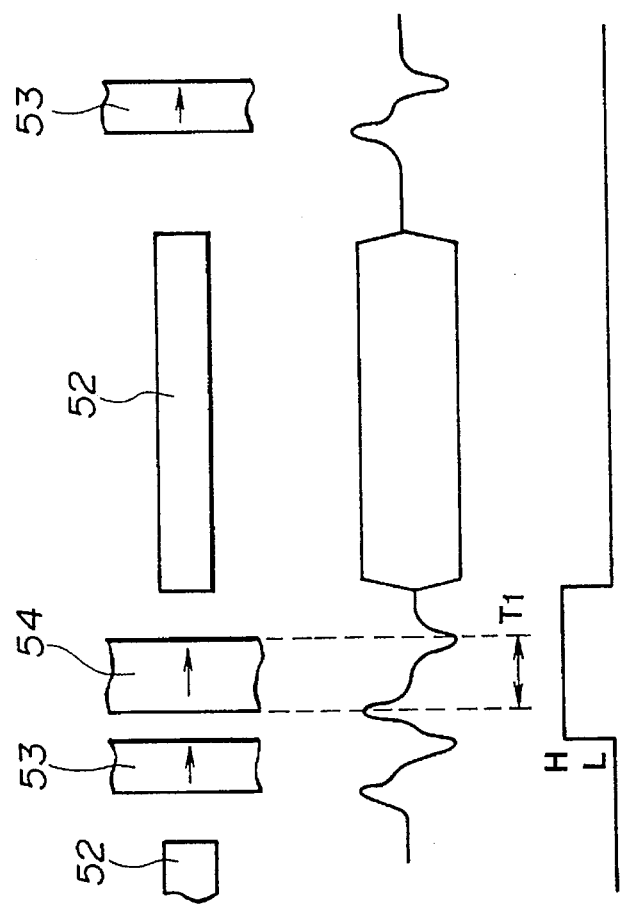
FIG.14(a) TRACK PATTERN
FIG.14(b) REPRODUCED SIGNAL
FIG.14(c) TIME MEASUREMENT WINDOW SIGNAL

DISK RECORDING AND/OR REPRODUCING APPARATUS THAT COMPENSATES FOR BIT NONLINEARITY AND A PHASE SHIFT INTRODUCED BY SEPARATE READ AND WRITE HEADS

This is a continuation of application Ser. No. 08/156,304 filed on Nov. 23, 1993, now abandoned.

BACKGROUND OF THE INVENTION (1) Field of the Invention

This invention relates to a magnetic disk device and a magnetic disk used in such a disk device, and more particularly to a magnetic disk device of the so-called external synchronization system using a head assembly of the recording and reproducing heads separation type.

(2) Description of the Related Art

In magnetic disk devices, as means for obtaining a clock signal required in recording or reproduction of data, there are known so called a self-synchronization system of writing so called servo information onto a magnetic disk at the same time in recording data thereonto to reproduce the servo information to generate a clock signal on the basis of the reproduced servo information, or to reproduce the recorded data to extract the clock component from the reproduced data to generate a clock signal; and so called an external synchronization system (sample servo system) in which clock patterns are formed in advance in a discrete manner on a magnetic disk to reproduce any clock pattern to generate a clock signal on the basis of a signal of the reproduced clock pattern.

In actual terms, a magnetic disk device of the external synchronization system comprises, as shown in FIG. 1, a magnetic head 111 commonly used for recording and reproduction, a selector (changeover) switch 112 for switching the magnetic head 111 depending upon any selected one of the recording mode and the reproducing mode, a reproducing amplifier 113 for amplifying a reproduced signal delivered from the magnetic head 111 through the selector switch 112, a clock signal generator 114 (hereinafter simply referred to as a clock generator 114) for generating a clock signal on the basis of a reproduced signal corresponding to a clock pattern of the magnetic disk 101 amplified by the reproducing amplifier 113, a data demodulator 115 for reproducing data from the reproduced signal from the reproducing amplifed 113 by using the clock signal from the clock generator 114, a timing generator 116 for counting the number of pulses of the clock signal from the clock generator 114 to control the clock generator 114, and to output a switching signal for controlling the selector switch 112, a recording data generator 117 for converting inputted data (hereinafter referred to as source data) to data suitable for recording (hereinafter referred to as recording data), and a recording amplifier 118 for delivering a current based on the recording data from the recording data generator 117 to the magnetic head 111 through the selector switch 112.

On the other hand, on the magnetic disk 101 used in this magnetic disk device, as shown in FIGS. 2(a) and 2(b), between data segments 102 serving as an area for recording data on recording tracks concentrically provided, radially continuous clock patterns 103 for clock generation (i.e., each clock pattern 103 for clock generation is radially continuous) are formed in advance by partially removing the magnetic layer which is the constituent of the magnetic disk, e.g., by using technique such as etching, etc. These clock patterns 103 are subjected to direct current magnetization (hereinafter simply referred to as d.c. magnetized) in one direction (indicated by an arrow), and are provided at about several hundreds~thousand (1000) portions per one circumference for the purpose of generating a high accuracy clock signal.

The magnetic head 111 reproduces a signal corresponding to data recorded on the data segments 102, and reproduces a signal corresponding to the clock pattern 103 to deliver these reproduced signals to the clock generator 114 and the data demodulator 115 through the selector switch 112 and the reproducing amplifier 113.

The clock generator 114 is comprised of, e.g., so called a PLL (Phase Locked Loop), etc., and serves to generate a clock signal on the basis of the reproduced signal corresponding to the clock pattern 103.

Namely, when clock pattern 103 d.c. magnetized in one direction is reproduced as shown in FIG. 3a, a reproduced signal having isolated waveforms at the forward and backward edges of each clock pattern 103 is obtained. The timing generator 116 counts the number of pulses of a clock signal delivered from the clock generator 114 to predict an occurrence (appearance) period of the reproduced signal corresponding to the clock pattern 103 on the basis of the past record (history) to generate a clock gate signal caused to be at high level (hereinafter referred to as H level) for this time period (occurrence period of the reproduced signal corresponding to the pattern 103) as shown in FIG. 3c to deliver this clock gate signal to the clock generator 114. The clock generator 114 considers an isolated waveform appearing within a time period for which the clock gate signal is at H level to be a normal clock pattern to update the phase of the PLL so that the rising of each clock signal (pulse) becomes synchronous with the peak of the isolated waveform corresponding to the forward edge, thus to generate a clock signal synchronous in phase with the clock pattern 103.

When the operation of the device is in the reproducing mode, the data demodulator 115 discriminates or demodulates a reproduced signal, e.g., by using a clock signal generated by the clock generator 114 to thereby reproduce data.

On the other hand, in the recording mode, by controlling the switching operation of the selector switch 112 by using a switching signal delivered from the timing generator 116, recording of data is carried out.

Namely, the timing generator 116 counts the number of pulses of a clock signal to thereby generate a switching signal which is caused to be at L level for a time period during which the magnetic head 111 scans the data segment 102 and is caused to be at H level for a time period during which the magnetic head 111 scans the clock pattern 103 to control the switching operation of the selector switch 112 by this switching signal. As a result, the magnetic head 111 is connected to the recording amplifier 118 when the switching signal is at L level and is connected to the reproducing amplifier 113 when it is at H level.

The recording data generator 117 converts source data to recording data synchronous with a clock signal generated at the clock generator 114 by a predetermined modulation suitable for recording. The recording amplifier 118 amplifies this recording data to deliver a current based on the recording data to the magnetic head 111 through the selector switch 112.

In actual terms, as shown in the above-mentioned FIG. 3b, for a time period during which the recording head 111 scans the clock pattern 103, the switching signal is caused to be at H level. Thus, the magnetic head 111 is connected to the reproducing amplifier 113. As described above, reproduction of the clock pattern 103 is carried out. Thus, a clock signal is generated. When a time period during which the magnetic head 111 scans the data segments 102 is initiated, the switching signal shifts to L level. Thus, the magnetic head 111 is connected to the recording amplifier 118. As a result, recording of data is carried out. Reproduction of clock patterns 103 and data recording are interchangeably carried out, whereby recording of data synchronous with the clock signal generated at the clock generator 114 is carried out as shown in FIG. 3f. Accordingly, in the reproducing mode, by discriminating a reproduced signal at the rising time of each clock signal (pulse) (hereinafter referred to as a data existing point phase) generated at the clock generator 114, the reproduced signal is referenced at the existing position in a running direction of the magnetic head 111 of data recorded on the data segment 102. Thus, data reproduction free from error can be carried out.

Meanwhile, so called a magneto-resistance effect type head (hereinafter referred to as a MR head) has an excellent characteristic, e.g., excellent sensitivity, S/N (Signal to Noise ratio), and spatial resolution. When this MR head is used for attaining high density recording, the above-described magnetic head 111 is, as shown in FIG. 4, composed of a reproducing head 111a comprised of MR head and a recording head 111b comprised of an ordinary magnetic head. Namely, independent heads for recording and reproduction (so called a head assembly of the recording and reproducing heads separation type) are used. In this case, however, problems as described below would take place.

As described above, in the magnetic disk device of the external synchronization system, the phase of the data existing point is determined on the basis of a reproduced signal corresponding to the clock pattern 103 obtained by the reproducing head 111a. When the operation is in the reproducing mode, the position of the reproducing head 111a at the data existing point phase is caused to be the data existing point position on the data segment 102. Accordingly, in recording data, it is necessary to carry out recording so that the data existing point phase and the data existing point position on the data segment 102 when viewed from the reproducing head 111a are in correspondence with each other at all times. However, in the case where the recording head 111b and the reproducing head 111a are separate, the data existing point phase and the data existing point, position on the data segment 102 when viewed from the recording head 111b are not in correspondence with each other in general by the physical position relationship between both heads. In more practical sense, as shown in the above-mentioned FIG. 4, the recording head 111b is attached relative to, i.e., away from the reproducing head 111a by a length L in a backward direction. Accordingly, in carrying out recording, recording operation must be conducted after the reproducing head 111a at the data existing point phase is moved to the position of the recording head 111b with rotation of the disk.

A time T1 (phase shift) required for the above-mentioned movement is determined by a length L between the reproducing head 111a and the recording head 111b and a relative velocity v between the head 111 and the magnetic disk 101. Namely, this movement time T1 is expressed as T1=L/v. In a magnetic disk device adapted to rotationally drive magnetic disk 101 at so called a CAV (Constant Angular Velocity), since the relative velocity v between the head 111 and the magnetic disk 101 varies depending upon the position in a radial direction where the head 111 exists, the movement time T1 will be also dependent upon the position in the disk radial direction of the head 111. A magnetic disk device adapted to record data by taking such phase shift into consideration is disclosed by this applicant in the Japanese Patent Application No. 276165/1992 (not yet laid open as of Nov. 30, 1993).

Further, in the magnetic disk device, a recording current caused to flow in the recording head 111b is inverted to produce reversal of magnetization on the data segment 102 to thereby record data. However, in the case where the recording density is high, a phenomenon such that the position of reversal of magnetization remaining on the data segment 102 is shifted relative to the position where the recording current is inverted (which phenomenon will be hereinafter referred to as a non-linear bit shift) occurs as shown in FIG. 5. It is known that the direction and the magnitude of shift in the non-linear bit shift is dependent upon the pattern of data to be recorded. In order to allow reversal of magnetization to remain at a normal position on the data segment 102, in carrying out recording, the inverting position of the recording current must be moved in advance in a direction opposite to the direction where shift takes place. The above-mentioned application (Japanese Patent Application No. 276165/1992) neither describes or suggests such non-linear bit shift.

As stated above, in the magnetic disk device of the external synchronization system using head (assembly) 111 of the recording/reproducing heads separation type, any time difference occurs between a data existing point phase generated on the basis of clock pattern 103 and a time at which the recording current should be actually inverted, viz., a phase shift of data recorded onto the magnetic disk 101 resulting from distance L in a running direction between the reproducing head 111a and the recording head 111b and a positional shift of reversal of magnetization resulting from the pattern of recording data take place. In addition, since those shifts vary depending upon the position in a disk radial direction of the head 111, or the pattern of data to be recorded, it is impossible to record data at a correct position. As the technology for allowing the influence of the non-linear bit shift to be small, U.S. Pat. No. 4,964,107 (International Business Machines Corporation, Oct. 16, 1990) is known. Namely, a circuit for a partial-response, maximum likelihood (PRML) magnetic recording channel stretches and shrinks pulses in particular write-data sequences. The circuit maintains precise tracking in the delays among multiple signals by sending them through the same number of identical circuits on the same chip. An external digital code varies the amount of delay in a clock signal so as to stretch and shrink the data pulses by different amounts. This patent describes the non-linear bit shift, but neither describes or suggests the problem of the phase shift of data recorded onto a magnetic disk resulting from the distance in a running direction between the reproducing head and the recording head.

Accordingly, a magnetic disk device capable of solving both problems of the phase shift and the non-linear bit shift is required.

OBJECT AND SUMMARY OF THE INVENTION

In view of actual circumstances as stated above, this invention has been made, and its object is to provide a magnetic disk device of the external synchronization system using a head assembly of the recording/reproducing heads separation type, which is capable of recording data at a correct position on a magnetic disk, and a magnetic disk used in such disk device.

To achieve the above-mentioned object, a magnetic disk device according to this invention is characterized in that, in a magnetic disk device for recording data onto a magnetic disk on which a clock pattern for clock signal generation is recorded in advance, or reproducing the recorded data therefrom, the magnetic disk device comprises a reproducing head for reproducing data from the magnetic disk, clock signal generating means for generating a clock signal on the basis of a signal corresponding to the clock pattern reproduced by the reproducing head, delay means for delaying recording data relative to the clock signal generated by the clock signal generating means, a recording head for recording recording data delayed by the delay means onto the magnetic disk, position detecting means for detecting head position information in a disk radial direction of the recording head on the basis of the reproduced signal from the reproducing head, and control means for controlling a quantity of delay of the delay means on the basis of the head position information from the position detecting means and a predetermined magnetization reversal pattern.

Further, the control means controls a quantity of delay of the delay means so as to compensate a phase shift of data recorded onto the magnetic disk resulting from a distance in a running direction between the reproducing head and the recording head, and to compensate a positional shift of reversal of magnetization resulting from a pattern of recording data on the basis of a pattern where the magnetization reversal interval of the recording data becomes minimum.

In addition, the magnetic disk device further includes timing generating means for generating a switching signal for carrying out switching between the recording mode and the reproducing mode by counting the number of pulses of a clock signal obtained from the clock signal generating means, and the delay means delays the switching signal by a quantity of delay corresponding to the phase shift determined by the control means.

BRIEF DESCRIPTION OF THE DRAWINGS

FIGS. 3(a)–3(f) is a view showing a time chart for explaining the operation of the conventional magnetic disk device.

FIGS. 14(a)–14(c) is a view showing a time chart for explaining the operation of the time measurement circuit shown in FIG. 13.

DESCRIPTION OF THE PREFERRED EMBODIMENTS

A preferred embodiment of a magnetic disk device according to this invention will now be described with reference to the attached drawings.

Figure 6:
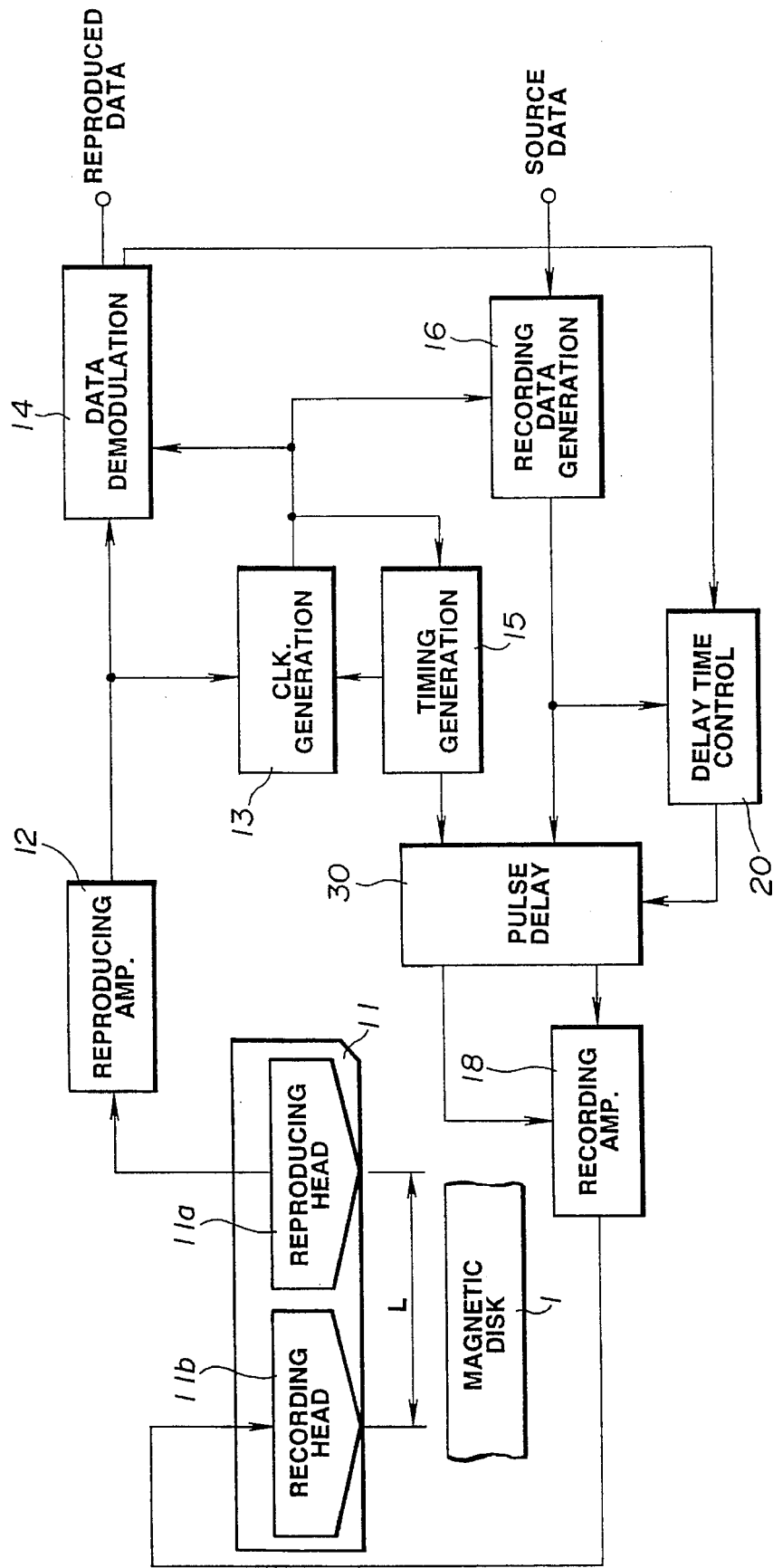
FIG. 6 is a block diagram showing a circuit configuration of a magnetic disk device to which this invention is applied.

A magnetic disk device to which this invention is applied is directed to a magnetic disk device of the so-called external synchronization system (sample servo system) adapted to record data onto a magnetic disk on which clock patterns for clock generation are recorded in advance, or reproducing recorded data therefrom. For example, as shown in FIG. 6, this magnetic disk device comprises a reproducing head 11a for reproducing data from a magnetic disk 1, a reproducing amplifier 12 for amplifying a reproduced signal obtained by the reproducing head 11a, a clock signal generator 13 (hereinafter simply referred to as a clock generator 13) for generating a clock signal on the basis of the reproduced signal corresponding to the clock pattern of the magnetic disk 1 amplified by the reproducing amplifier 12, a data demodulator 14 for reproducing data, etc. from the reproduced signal from the reproducing amplifier 12 by using the clock signal from the clock generator 13, a timing generator 15 for counting the number of pulses of the clock signal from the clock generator 13 to control the clock generator 13, and to output a switching signal for carrying out switching between the recording mode and the reproducing mode, a recording data generator 16 for converting inputted data (hereinafter referred to as source data) to data suitable for recording (hereinafter referred to as recording data), a pulse delay circuit 30 for delaying recording data from the recording data generator 16, a recording head 11b for recording the recording data delayed by the pulse delay circuit 30 onto the magnetic disk 1, a recording amplifier 18 for delivering, to the recording head 11b, a current based on the recording data delayed by the pulse delay circuit 30, and a delay time control circuit 20 for controlling a quantity of delay of the pulse delay circuit 30 on the basis of a position in a disk radial direction of the recording head 11b (hereinafter referred to as head position information) from the data demodulator 14.

The reproducing head 11a is comprised of, e.g., so called a magneto-resistance effect type head (MR head) for attaining high density recording, and the recording head 11b is comprised of an ordinary magnetic head. The reproducing head 11a and the recording head 11b are disposed in such a manner that they are spaced by a distance L in its running direction. These reproducing head 11a and recording head 11b constitute head (assembly) 11 of the so-called recording/reproducing heads separation type head.

Figure 1:
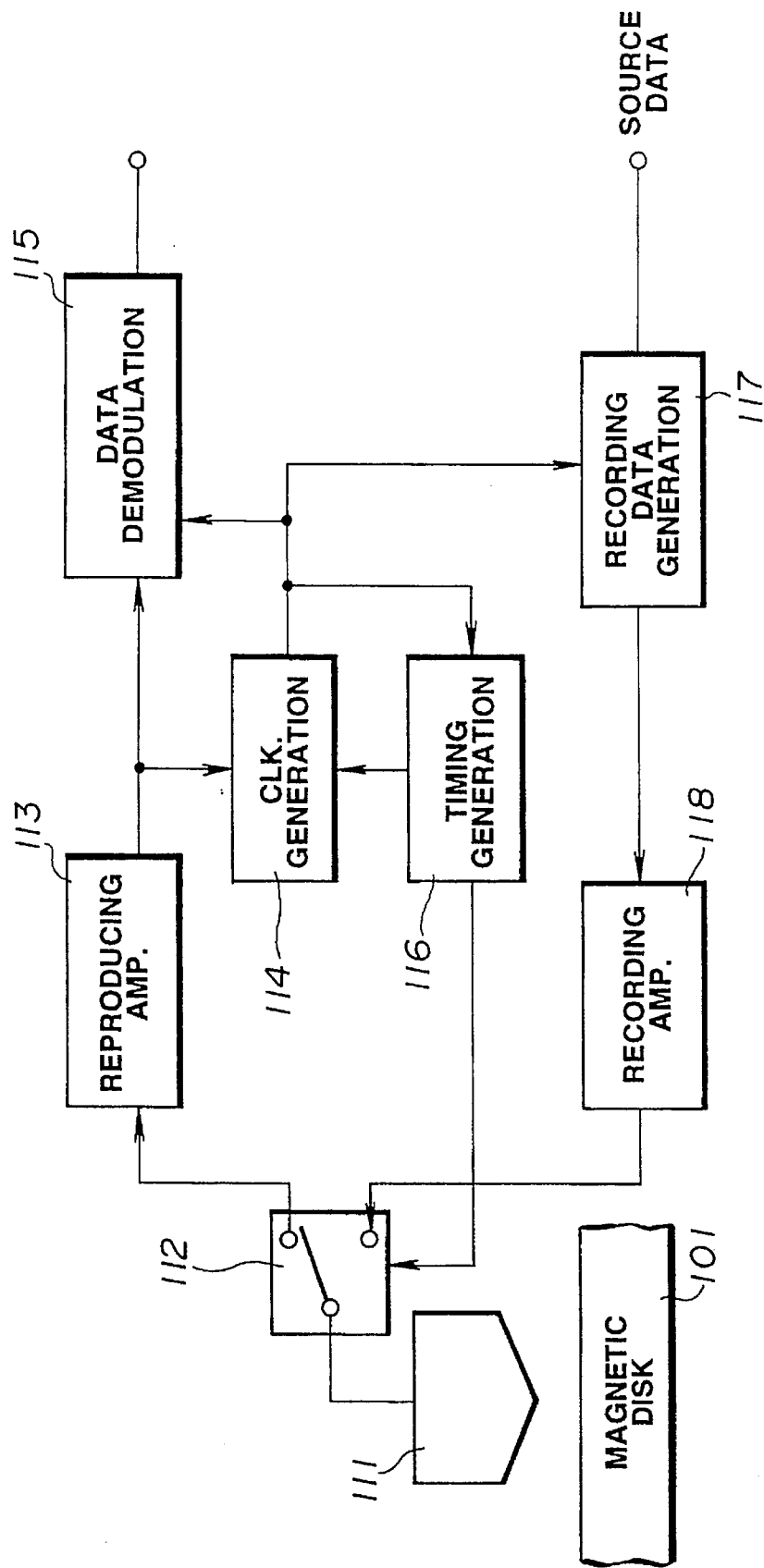
FIG. 1 is a block diagram showing a circuit configuration of a conventional magnetic disk device.
Figures 2A, 2B:
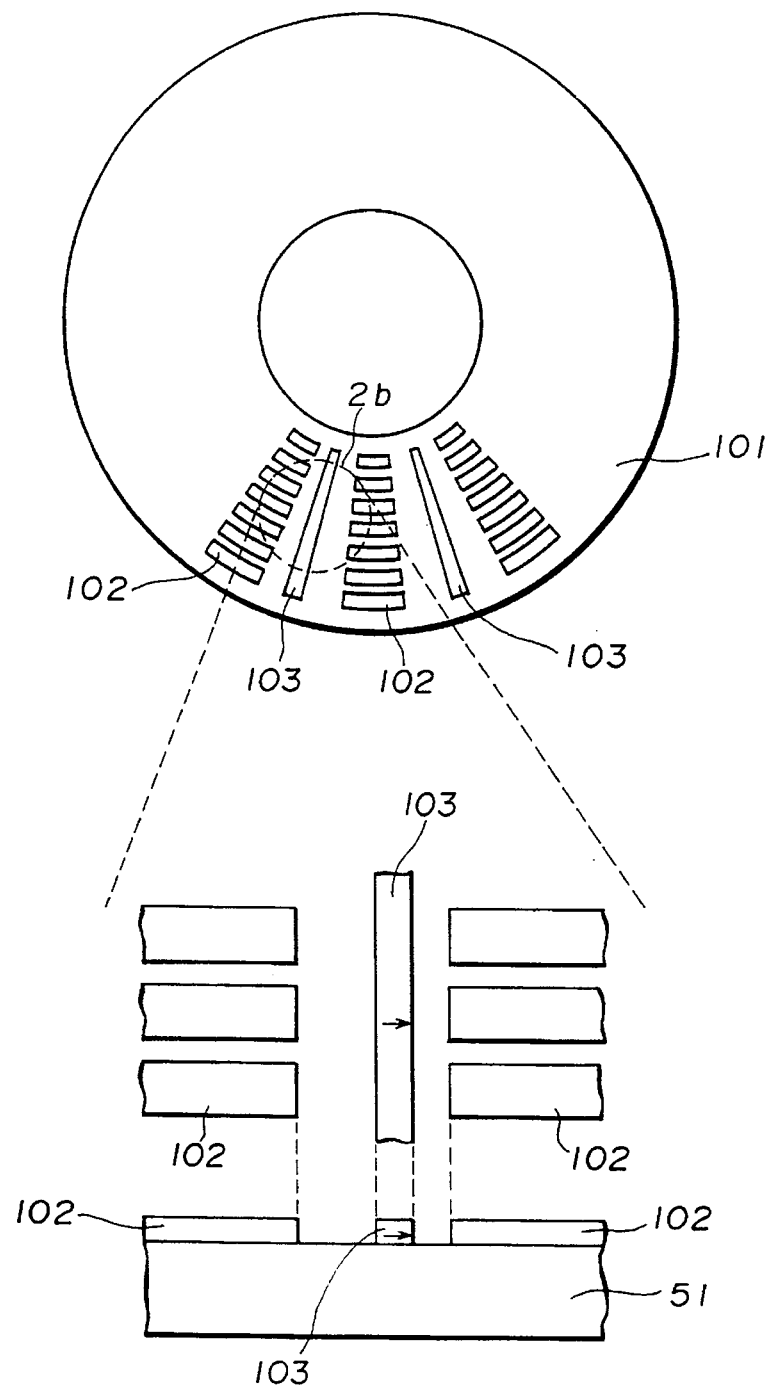
FIGS. 2(a) and 2(b) are views showing a recording format of the conventional magnetic disk.
Figure 4:
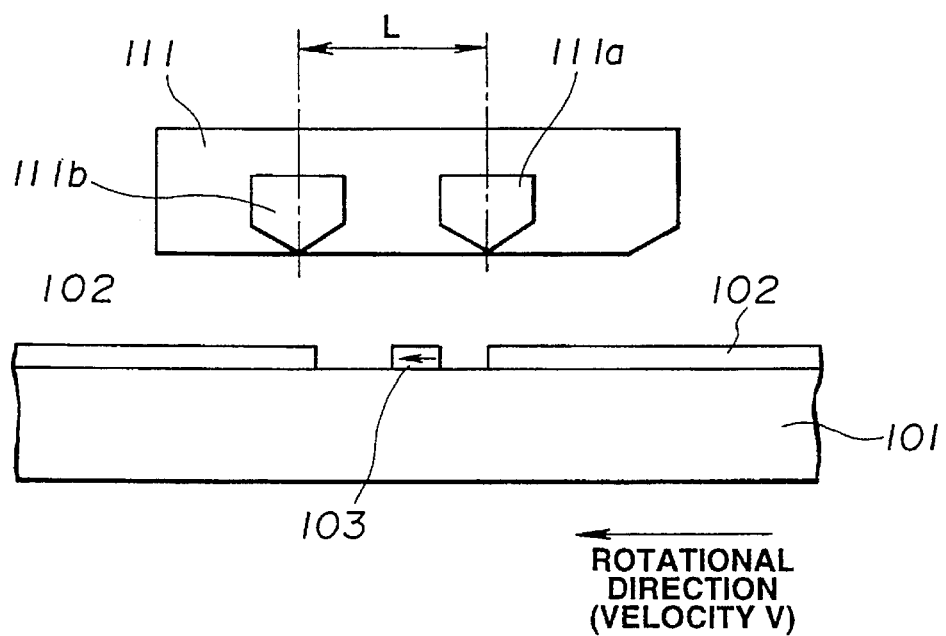
FIG. 4 is a view showing a head assembly of the recording/reproducing heads separation type.
Figure 5:
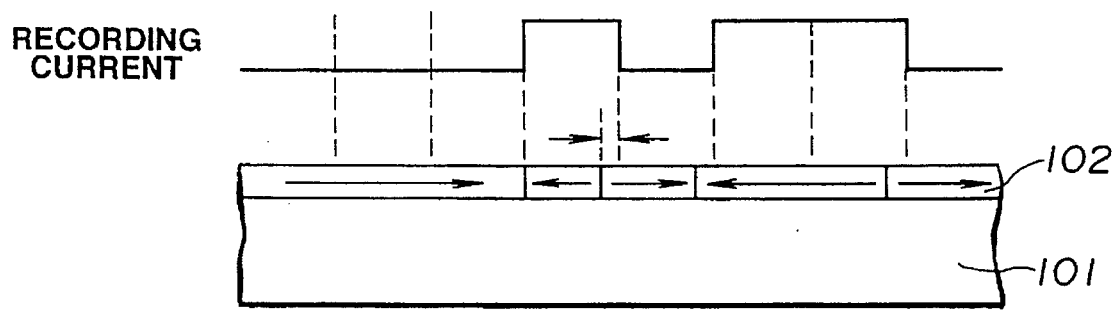
FIG. 5 is a view showing the direction of magnetization for explaining a non-linear bit shift.
Figure 7:
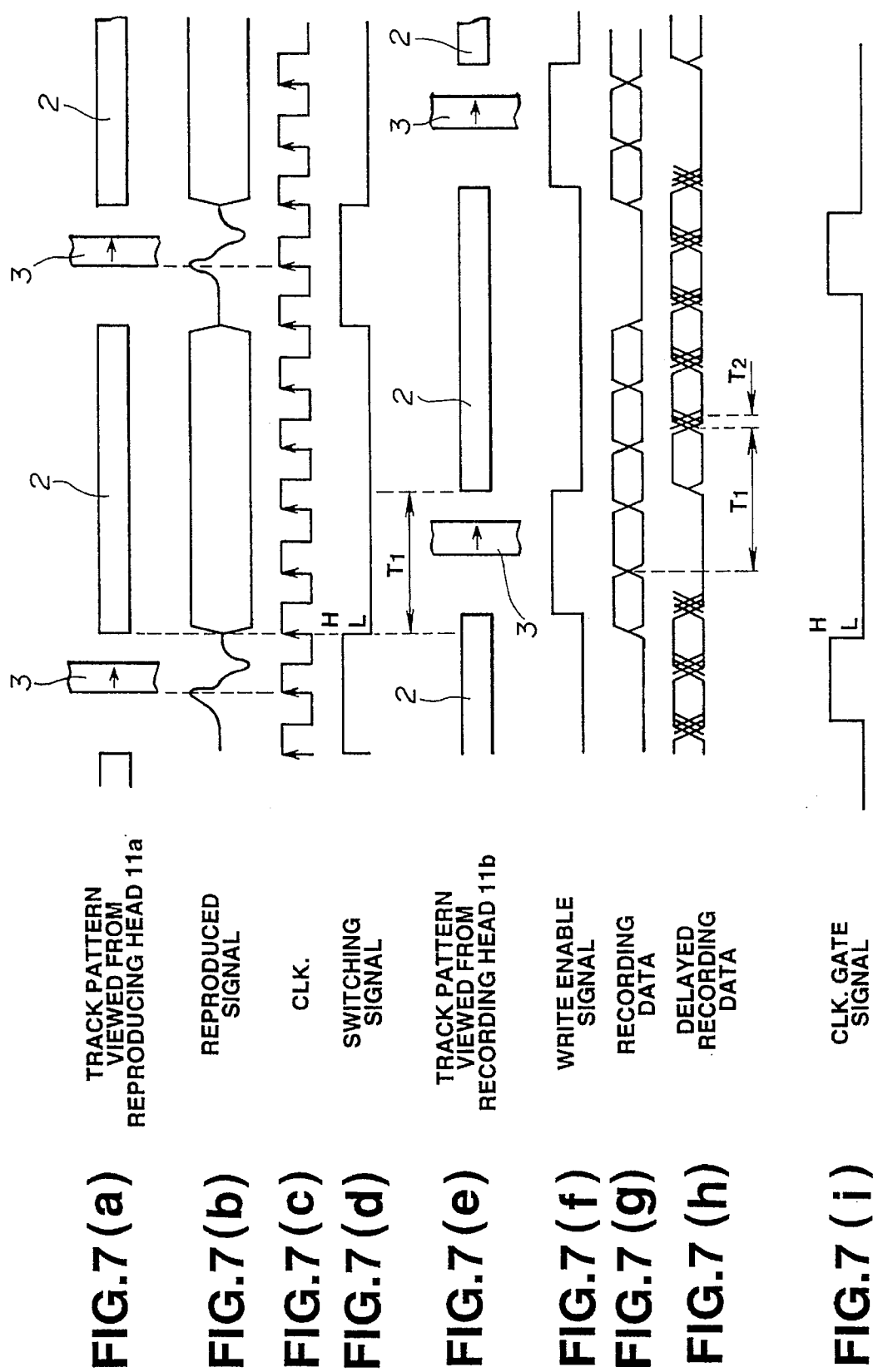
FIGS. 7(a)–7(i) is a view showing a time chart for explaining the operation of the magnetic disk device shown in FIG. 6.

On the other hand, on the magnetic disk 1 rotationally driven at a constant angular velocity (CAV) by so called a spindle motor (not shown), as described in the prior art (see FIGS. 2(a) and 2(b)), between data segments 2 (see FIG. 7a)

(corresponding to data segments 102) serving as the area where data on recording tracks concentrically provided are recorded, radially continuous clock patterns 3 (see FIG. 7a) (corresponding to clock patterns 103) for clock generation are permanently formed in advance, e.g., by partially removing the magnetic layer which is the constituent of the magnetic disk by using technique such as etching, etc. These clock patterns 3 are d.c. magnetized in one direction, and are provided at about several hundreds~thousand (1000) portions per one circumference for generating a high accuracy clock signal.

The reproducing head 11a reproduces a signal corresponding to data recorded on the data segment 2, and reproduces a signal corresponding to the clock pattern 3 to deliver these reproduced signals to the clock generator 13 and the data demodulator 14 through the reproducing amplifier 12.

The clock generator 13 is comprised of, e.g., so called a PLL (Phase Locked Loop), etc., and serves to generate a clock signal on the basis of the reproduced signal corresponding to the clock pattern 3.

Namely, when clock pattern 3 d.c. magnetized in one direction (indicated by an arrow) is reproduced, as shown in FIG. 7a, for example, a reproduced signal having isolated waveforms at forward and backward edges of the clock pattern 3 is provided as shown in FIG. 7b, for example. The timing generator 15 counts the number of pulses of a clock signal delivered from the clock generator 13 to predict an occurrence (appearance) time period of the reproduced signal corresponding to the clock pattern 3 on the basis of a past record (history) to deliver a clock gate signal (FIG. 7i) indicating that time period (e.g., by H level) to the clock generator 13, and to generate a switching signal for carrying out switching between the recording mode and the reproducing mode as shown in FIG. 7d, for example. The clock generator 13 considers an isolated waveform appearing within a time period during which the clock gate signal is at H level to be a normal clock pattern to update the phase of the PLL, as shown in FIG. 7c, for example, so that the rising of each clock signal (pulse) becomes synchronous with the peak of an isolated waveform corresponding to the forward edge, thus to generate a clock signal synchronous in phase with the clock pattern 3.

When the operation is in the reproducing mode, the data demodulator 14 discriminates or demodulates a reproduced signal, e.g., at the rising time of a clock signal (hereinafter referred to as a data existing point phase) generated by the clock generator 13 to thereby reproduce data. In addition, this data demodulator 14 reproduces head position information in a disk radial direction of the head 11 on the basis of the reproduced signal to deliver this head position information to the delay time control circuit 20.

On the other hand, in the recording mode, the recording data generator 16 converts source data to recording data synchronous with a clock signal generated at the clock generator 13 by a predetermined modulation suitable for recording to deliver the recording data synchronous with the clock signal to the pulse delay circuit 30 and the delay time control circuit 20.

The pulse delay circuit 30 delays recording data under control of the delay time control circuit 20 so as to compensate a phase shift of data recorded on the data segment 2 resulting from a distance L in a running direction between the reproducing head 11a and the recording head 11b, and to compensate a positional shift of reversal of magnetization (non-linear bit shift) resulting from the pattern of recording data as described later. The recording amplifier 18 amplifies the recording data thus delayed to deliver a current based on the recording data to the recording head 11b.

Figure 8:
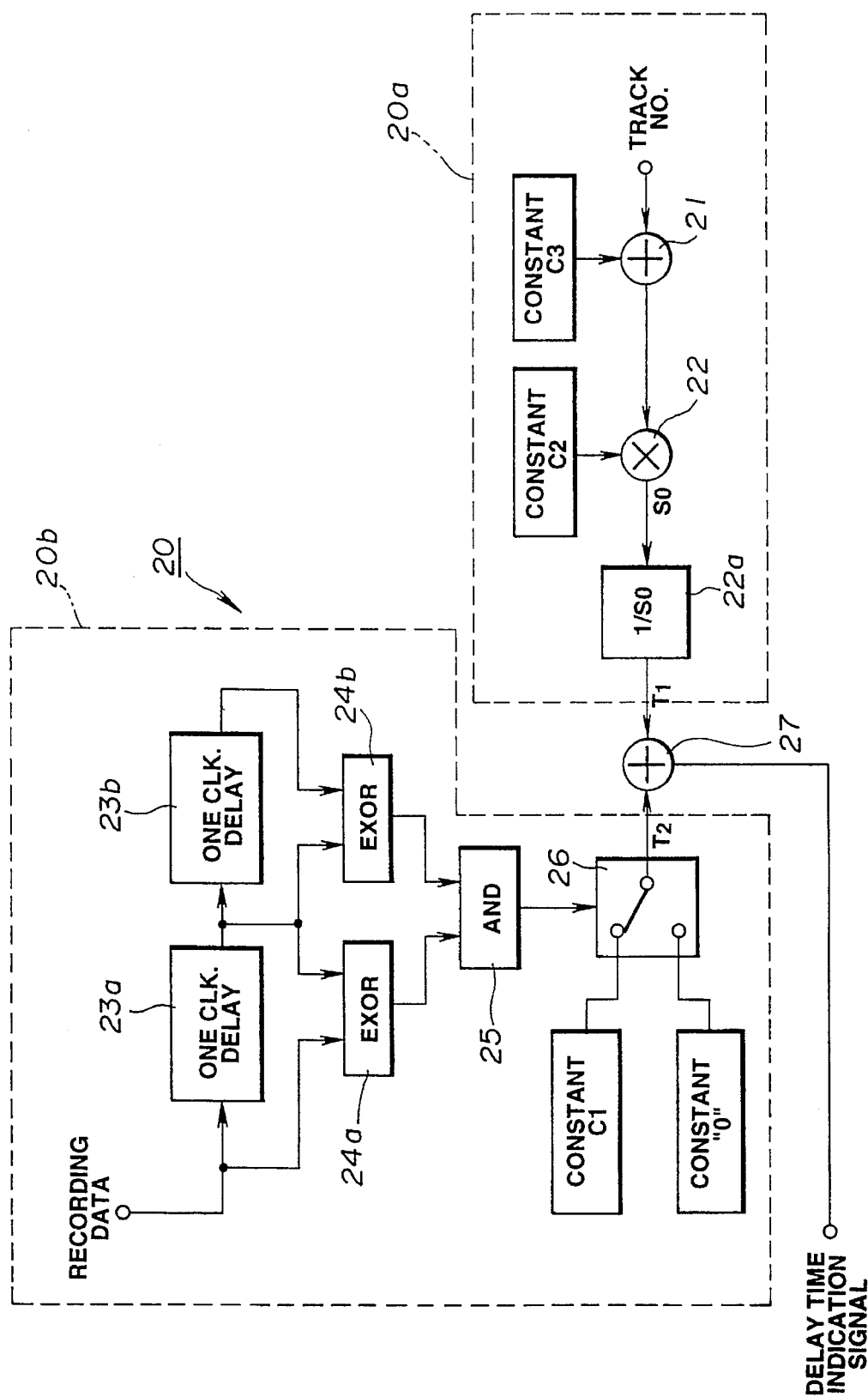
FIG. 8 is a block diagram showing an actual circuit configuration of a delay time control circuit constituting the magnetic disk device shown in FIG. 6.

In actual terms, the delay time control circuit 20 roughly comprises, as shown in FIG. 8, for example, a phase shift calculating unit 20a and a positional shift calculating unit 20b. More particularly, the phase shift calculating unit 20a includes an adder 21 for adding a constant C3 to head position information (e.g., track No., etc) from the data demodulator 14, and a multiplier 22 for multiplying an output from the adder 21 by a constant C2. On the other hand, the positional shift calculating unit 20b includes delay elements 23a, 23b cascade-connected, which are adapted to respectively delay recording data from the recording data generator 16 by one clock pulse, an exclusive logical sum circuit (hereinafter referred to as EX-OR) 24a for performing an exclusive logical sum operation of recording data from the recording data generator 16 and recording data delayed at the delay element 23a, an EX-OR 24b for performing an exclusive logical sum operation of the recording data delayed at the delay element 23a and recording data delayed at the delay element 23b, a logical product circuit (hereinafter referred to as AND) 25 for performing a logical product operation of an output of the EX-OR 24a and an output of the EX-OR 24b, and a selector switch 26 for carrying out selective switching between constant C1 and constant 0 on the basis of an output of the AND 25. In addition, the delay time control circuit 20 further includes an adder 27 for adding an output of the selector switch 26 and an output of the multiplier 22, which is obtained through an inverse number element 22a described later.

This delay time control circuit 20 calculates, on the basis of head position information delivered from the data demodulator 14 and the pattern of recording data, a time difference between the data existing point phase and a time at which the recording current should be actually inverted to output a delay time indication signal.

Namely, assuming now that head position information delivered from the data demodulator 14 is a track number N where, e.g., the head 11 is positioned at present, the adder 21 adds the track number N and the constant C3, and the multiplier 22 multiplies the added value by the constant C2. As a result, from the multiplier 22, a value proportional to the distance (N+C3) from the disk center of the head 11, which is obtained by an operation indicated by the following formula (1), is outputted as an inverse number S0 of a delay time T1 for compensating a phase shift of data resulting from the distance L in the running direction between the reproducing head 11a and the recording head 11b. This S0 is caused to be passed through an inverse number element 22a. Thus, T1 is obtained:

$$S0 = 1/T1 = (N+C3) \times C2 \qquad (1)$$

It is to be noted that in the case where the velocity when the head 11 is positioned on a track of the number N is assumed to be v, constants C2 and C3 are values to satisfy T1=L/v.

Figure 9:
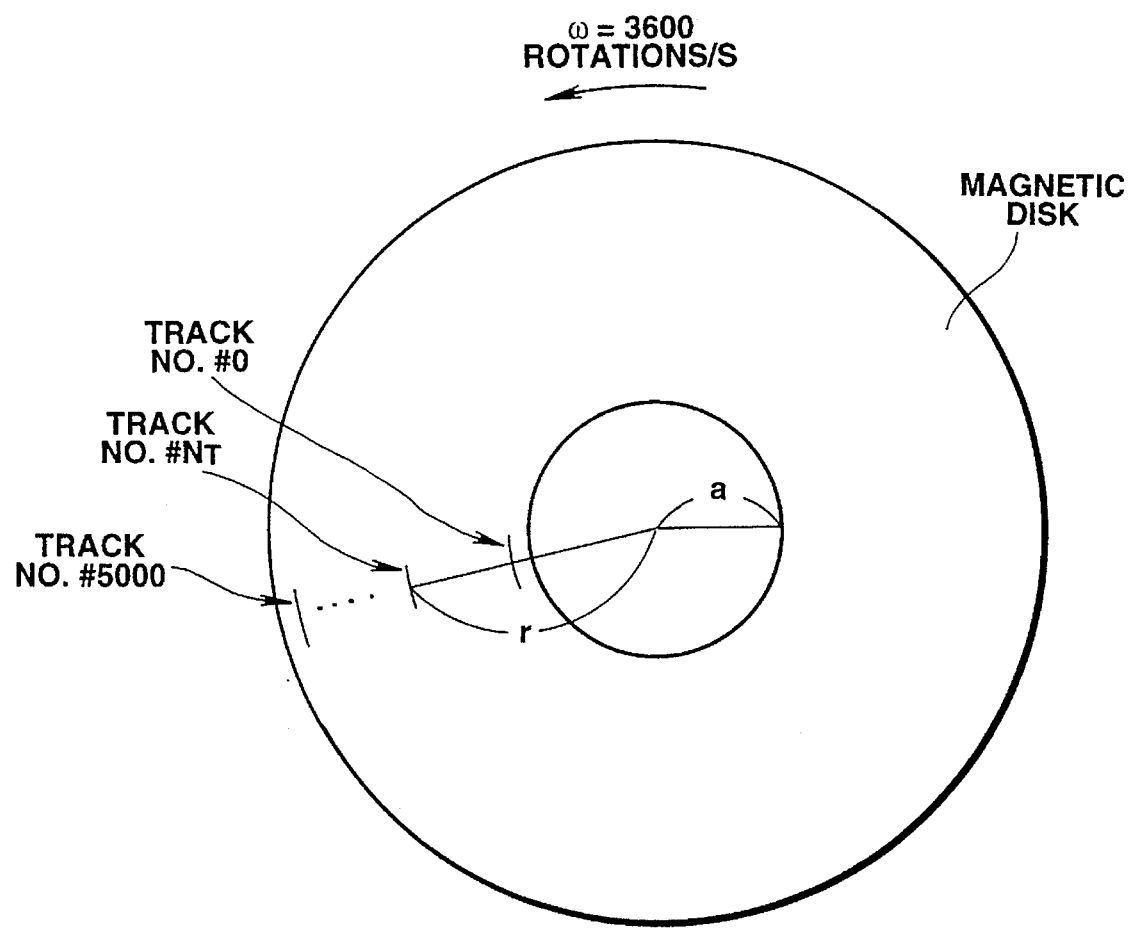
FIG. 9 is a view showing an example of a magnetic disk used for explaining a calculation method of a delay time for compensation of a phase shift of data in this invention.

Namely, as shown in FIG. 9, when it is assumed that the angular velocity ω is 3600 rotations/s, the radius at the track number N is r, the track pitch is Tp, and the radius of the innermost circumference is a, the velocity v is expressed as follows:

$$v = 2\pi r\omega \quad = \quad 3600 \times 2\pi \times (Tp \times N + a) \qquad (2)$$
$$\quad = \quad 7200\pi Tp \times (N + a/Tp)$$

Thus, the following relationship holds:

$$S=1/T1=(7200\ \pi Tp/L)\times(N+a/Tp) \quad (3)$$

Accordingly, the constants C2, C3 are expressed as follows:

$$C2=7200\ \pi Tp/L,\ C3=a/Tp$$

On the other hand, the delay elements 23a, 23b delay recording data by one clock pulse, respectively. The EX-ORs 24a, 24b perform exclusive logical sum operations of adjacent two bits of continuous three bits of recording data, respectively. The AND 25 performs a logical product operation of respective outputs of EX-ORs 24a, 24b. As a result, from the AND 25, a continuous magnetization reversal detection signal which is caused to be, e.g., H level when the recording data has a pattern such that reversal of magnetization continuously takes place, i.e., a pattern (010 or 101) where the magnetization reversal interval is minimum is outputted.

The selector switch 26 carries out a selective switching operation on the basis of the continuous magnetic reversal detection signal such that when this signal is, e.g., at H level, it selects the constant C1, while when this signal is, e.g., at L level, it selects the constant 0 to deliver a selected constant to the adder 27. As a result, from the selector switch 26, with respect to a pattern continuously producing reversal of magnetization, i.e., a pattern where a non-linear bit shift takes place, the constant C1 is outputted as a delay time T2 for compensating the non-linear bit shift.

It is to be noted that, with respect to the constant C1, for example, the disk is divided into four zones to determine in advance values of C1 in respective zones to store them into ROM. The reason why values of C1 can be roughly determined in this way is that the non-linear bit shift quantity is a small value to such a degree of 10% of 1 bit.

The adder 27 adds the delay times T1 and T2 to deliver an added value (T1+T2) to the pulse delay circuit 30 as a delay time indication signal.

The pulse delay circuit 30 is such that its delay time can be controlled from the external. This delay circuit 30 delays, as shown in FIG. 7h, for example, recording data (shown in FIG. 7g) delivered from the recording data generator 16 by the time (T1+T2) indicated by the delay time indication signal delivered from the delay time control circuit 20, and delays a switching signal delivered from the timing generator 15 to generate a write enable signal, as shown in FIG. 7f, for example.

Figure 10:
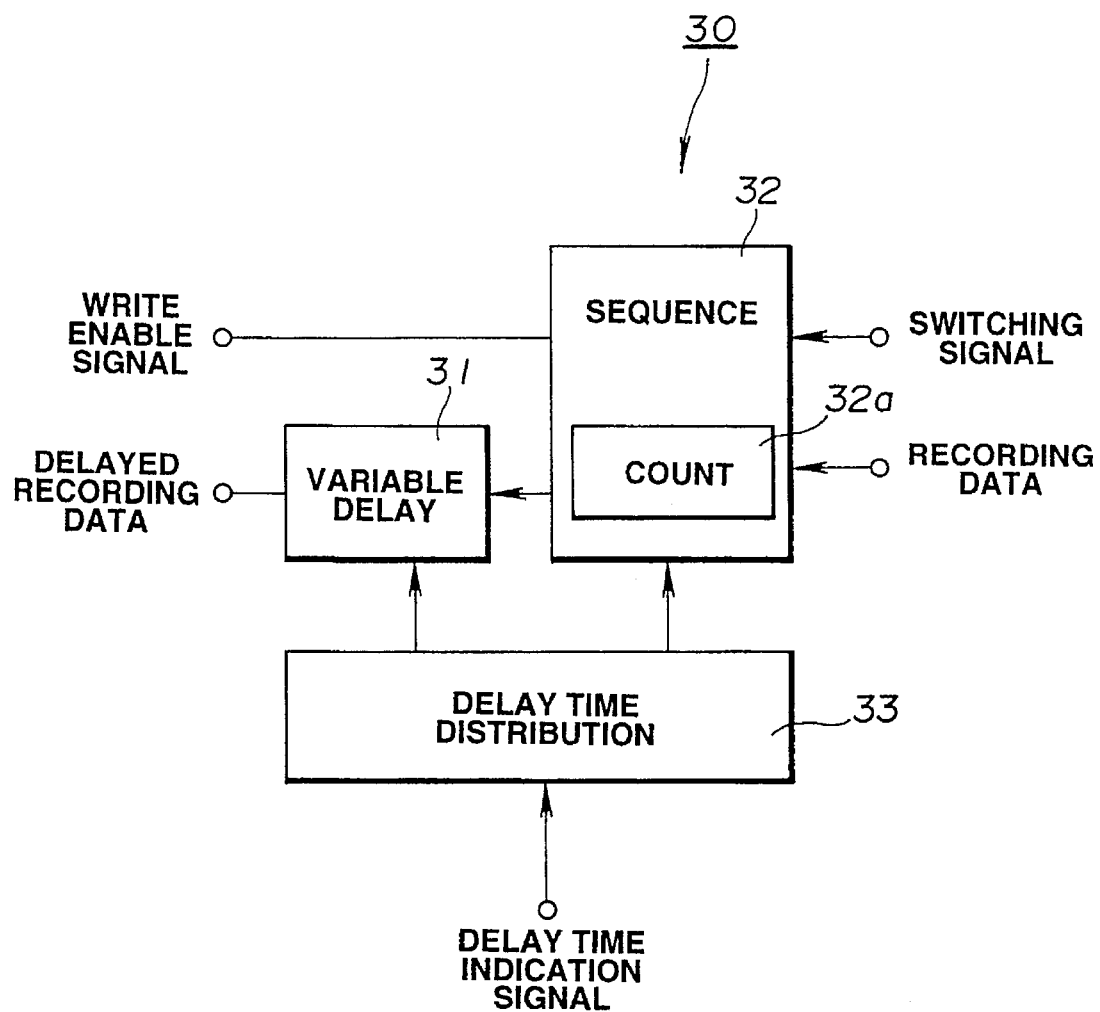
FIG. 10 is a block diagram showing an actual circuit configuration of a pulse delay circuit constituting the magnetic disk device shown in FIG. 6.

In more practical sense, the pulse delay circuit 30 comprises, as shown in FIG. 10, for example, a variable delay circuit 31 having a delay time of at least one clock pulse, a sequential circuit 32 having a delay time of one clock pulse unit, and a delay time distribution circuit 33 adapted to divide the delay time indication signal from the delay time control circuit 20 into a signal portion indicating a delay time of one clock pulse unit and a signal portion indicating a delay time of the remaining fractions to deliver those signal portions to the variable delay circuit 31 and the sequential circuit 32.

In operation, the delay time distribution circuit 33 divides a delay time indication signal delivered from the delay time control circuit 20 into a signal portion indicating a delay time of one clock pulse unit and a signal portion indicating a delay time of the remaining fractions to deliver the signal portion indicating the delay time of one clock pulse unit to the sequential circuit 32, and to deliver the signal portion indicating the delay time of the fractions to the variable delay circuit 31.

The sequential circuit 32 is a delay circuit operative in synchronism with a clock signal, and includes therein a counter 32a for counting the number of pulses of the clock signal. This counter 32a counts the number of pulses of the clock signal by a delay time of one clock pulse unit to thereby generate an intermediate output of a write enable signal in which the timing is shifted by a delay time of one clock pulse unit and recording data on the basis of the switching signal and the recording data.

On the other hand, the variable delay circuit 31 carries out a delay within a time period of one clock pulse in accordance with the signal portion indicating the delay time of the fractions to apply a finer delay to the intermediate output of the recording data to output the recording data thus delayed.

This pulse delay circuit 30 delivers, to the recording amplifier 18, the write enable signal and the delayed recording data. Namely, when such a configuration is employed, it is enough to provide only one variable delay circuit 31 having a large circuit scale and for which higher time accuracy is required. In addition, since it is sufficient that its maximum delay time is a length of one clock pulse, the circuit scale can be compact and the power consumption can be reduced.

The recording amplifier 18 carries out control of ON/OFF of a recording current in accordance with the write enable signal delivered from the pulse delay circuit 30 to carry out inverting operation of the recording current in accordance with recording data delayed at the pulse delay circuit 30.

Thus, the switching signal outputted from the timing generator 15 and the recording data outputted from the recording data generator 16 are caused to be synchronous with a clock signal (shown in FIG. 7c) generated at the clock generator 13 as shown in the above-mentioned FIGS. 7d, 7g. Namely, these signals correspond to the position on the data segment 2 when viewed from the reproducing head 11a as shown in the above-mentioned FIG. 7a. Meanwhile, when the relative velocity between the head 11 and the disk is assumed to be v, a time difference T1=L/v exists between the data segment 2 when viewed from the reproducing head 11a and the data segment 2 when viewed from the recording head 11b as shown in FIG. 7e. The pulse delay circuit 30 delays, as shown in the above-mentioned FIGS. 7f, 7h, a switching signal and recording data by the time difference T1 to respectively generate a write enable signal corresponding to the position on the data segment 2 when viewed from the recording head 11b and the delayed recording data, and to further implement delaying processing to the recording data by a time (T2) for compensating the above-described non-linear bit shift. As a result, it is possible to compensate a phase shift of data recorded on the data segment 2 resulting from the distance L in a running direction between the reproducing head 11a and the recording head 11b, and to compensate a positional shift of reversal of magnetization (non-linear bit shift) resulting from the pattern of recording data. Thus, data can be recorded at a correct position on the data segment 2.

In other words, by carrying out control of the start/end times at which the recording current is caused to flow and the inverting time of the recording current by using the pulse delay circuit 30, it is possible to record data at a correct position on the data segment 2 irrespective of the position in a disk radial direction of the head 11 and/or the pattern of data. Accordingly, in the reproducing mode, by carrying out discrimination of a reproduced signal at the rising time of a clock signal (data existing point phase) generated at the clock generator 14, a reproduced signal is referenced at the existing position of data recorded on the data segment 2. Thus, data reproduction free from error can be carried out.

Another actual circuit configuration of the delay time control circuit 20 shown in FIG. 6 will now be described.

Figure 11:
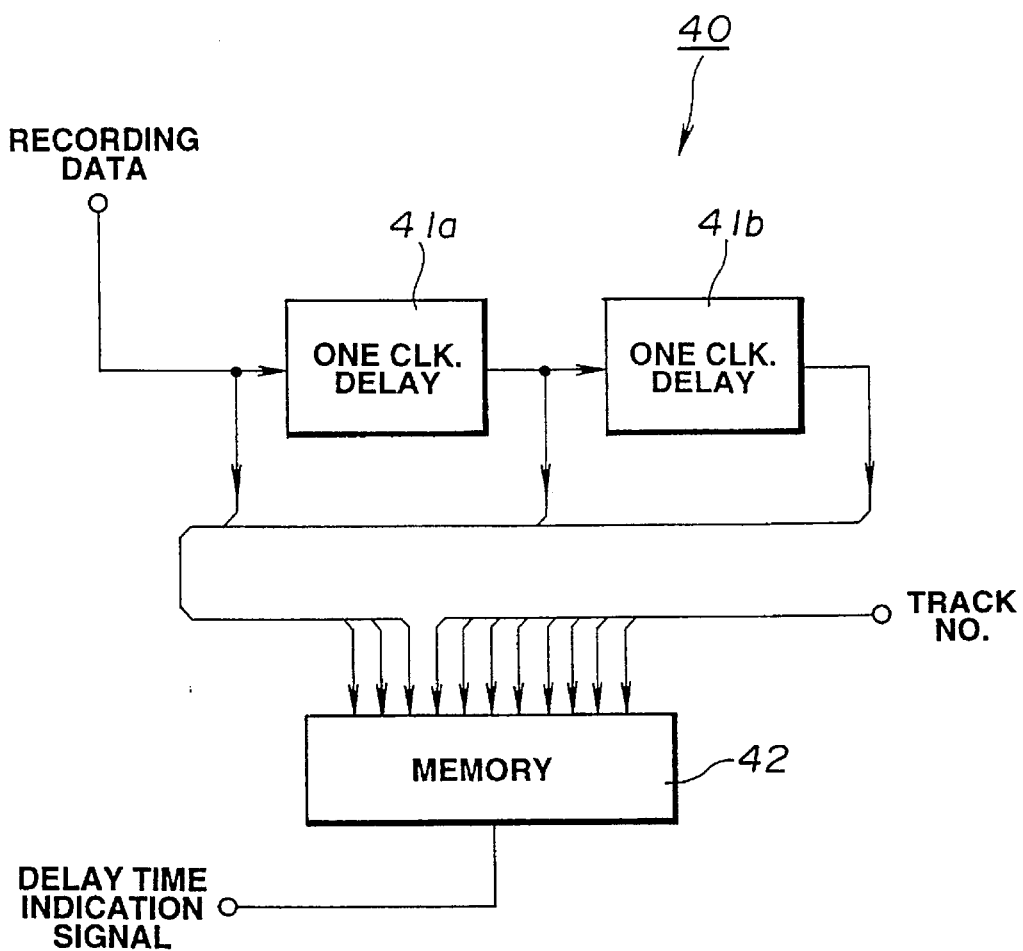
FIG. 11 is a block diagram showing another actual circuit configuration of the above-mentioned delay time control circuit.

This delay time control circuit (hereinafter referred to as a delay time control circuit 40) comprises, as shown in FIG. 11, for example, delay elements 41a, 41b cascade-connected which are adapted to respectively delay recording data from the recording data generator 16 by one clock pulse, and a memory 42 in which a delay time (T1+T2) is stored in advance with recording data delayed at the delay elements 41a, 41b and head position information from the data demodulator 14 being as a readout address.

The recording data delayed at the delay elements 41a, 41b are delivered to the memory 42 as a readout address of 11 bits together with a track number comprised of, e.g., 8 bits.

The memory 42 stores therein delay times corresponding to combination of track numbers and patterns of data, and serves to output a delay time indication signal in accordance with a readout address. Meanwhile, by storing suitable delay times in connection with all combinations of track numbers and patterns of recording data into the memory 42, it is possible to output, e.g., a non-linear delay time with respect to the position in a disk radial direction of the head 11, thus to carry out a fine control of the delay time.

Further, the delay time control circuit 40 and the above-described delay time control circuit 20 may be combined so that rough calculation of the delay time is carried out by the delay time control circuit 20, and the remaining fine time adjustment is carried out by the delay time control circuit 40, thus to reduce the capacity of the memory 42.

A magnetic disk to which this invention is applied and a magnetic disk device adapted for recording data onto the magnetic disk and reproducing the recorded data therefrom will now be described.

Figure 12:
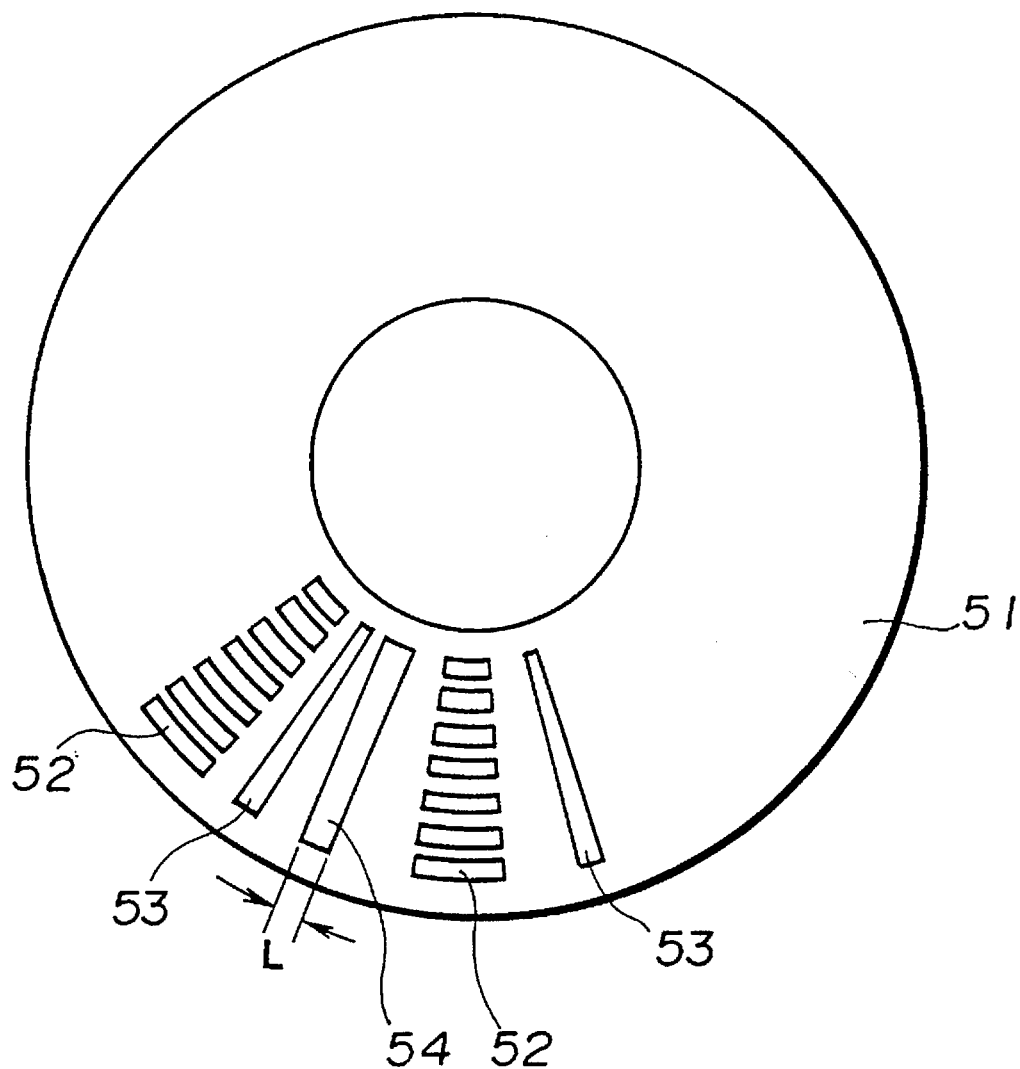
FIG. 12 is a view showing a recording format of a magnetic disk to which this invention is applied.

On a magnetic disk 51, as shown in FIG. 12, for example, between data segments 52 serving as an area for recording data on recording tracks concentrically provided, radially continuous clock patterns 53 for clock generation and timing compensation patterns 54 of a predetermined width, e.g., a width equal to the spacing (distance) L between the reproducing head 11a and the recording head 11b are permanently formed in advance by partially removing the magnetic layer which is the constituent of the magnetic disk by using technique such as etching, etc. The clock patterns 53 and the timing compensation patterns 54 are d.c. magnetized in one direction (indicated by an arrow).

Figure 13:
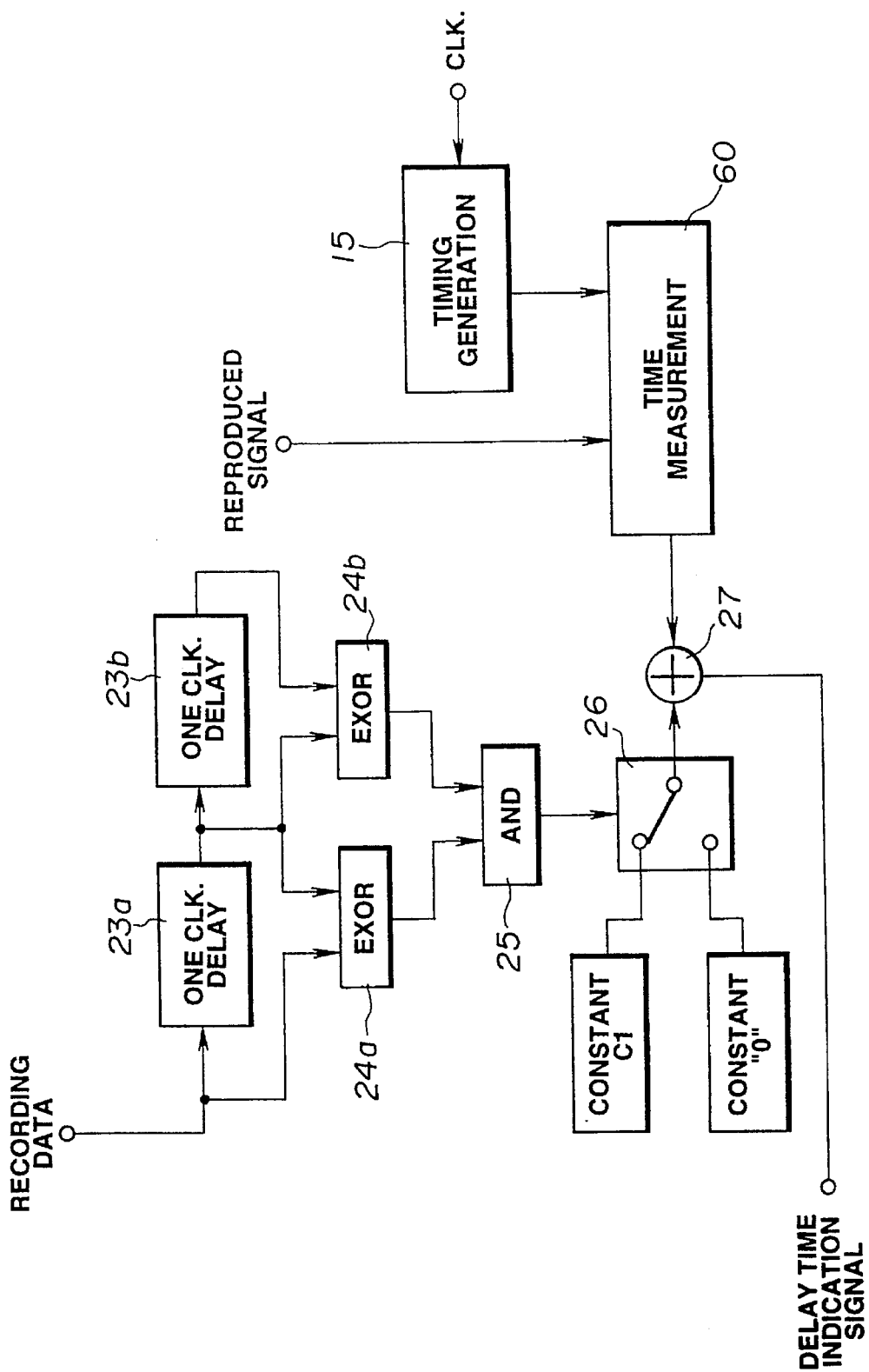
FIG. 13 is a block diagram showing a time measurement circuit constituting the magnetic disk device to which this invention is applied.

On the other hand, a magnetic disk device using the magnetic disk 51 includes a time measurement circuit 60 (see FIG. 13) for measuring the above-described time difference T1 in place of the phase shift calculating unit 20a (see FIG. 8) in the delay time control circuit 20 shown in FIG. 6. The entire configuration of the delay time control circuit 20 is shown in FIG. 13.

It is to be noted that explanation of circuit components having the same functions as those of circuit components shown in FIG. 6 is omitted.

The timing generator 15 is operative, as shown in FIG. 14c, for example, to count the number of pulses of a clock signal to generate a time measurement window signal indicating a time period during which the reproducing head 11a scans the timing compensation pattern 54 to deliver this time measurement window signal to the time measurement circuit 60.

The time measurement circuit 60 is operative, as shown in FIG. 14b, for example, to measure a time T1 between peaks of two isolated waveforms reproduced at the forward and backward edges of the timing compensation pattern 54 for a time period during which the time measurement window signal is at H level to deliver the time T1 to the pulse delay circuit 30 as a delay time indication signal. Namely, since the width L of the timing compensation pattern 54 is fixed irrespective of the radius of the disk, a time difference between the time at which the forward edge of the pattern 54 passes through the reproducing head 11a and the time at which the backward edge of the pattern 54 passes therethrough is always equal to a time difference T1 between a passage time of the reproducing head 11a and a passage time of the recording head 11b. Accordingly, the time difference between peaks of a reproduced signal corresponding to the timing compensation pattern 54 is the delay time T1 to be delivered to the pulse delay circuit 30. In other words, the delay time T1 can be directly determined from the timing compensation pattern 54 formed in advance on the magnetic disk 51. Further, the computational circuit elements such as adder 21, multiplier 22, etc. shown in FIG. 8 and/or memory 42 shown in FIG. 11 become unnecessary. Thus, the cost of the magnetic disk device can be reduced.

As is apparent from the foregoing description, this invention employs a scheme to delay recording data on the basis of head position information in a disk radial direction of the recording head to compensate a phase shift of data recorded onto the magnetic disk resulting from the distance in a running direction between the reproducing head and the recording head. Thus, in a magnetic disk device of the external synchronization system using a head assembly of the recording/reproducing heads separation type, it is possible to record data at a correct position on the magnetic disk irrespective of the position in a disk radial direction of the recording head. As a result, data reproduction free from error can be carried out.

Further, this invention employs a scheme to delay recording data on the basis of head position information in a disk radial direction of the recording head to compensate a phase shift of data recorded onto the magnetic disk resulting from the distance in a running direction between the reproducing head and the recording head, and to delay recording data on the basis of the pattern of the recording data to compensate a positional shift of reversal of magnetization resulting from the pattern of the recording data. Thus, in a magnetic disk device of the external synchronization system using a head assembly of the recording/reproducing heads separation type, data can be recorded at a correct position on the magnetic disk irrespective of the position in a disk radial direction of the recording head or the pattern of data. As a result, data reproduction free from error can be carried out.

In addition, this invention employs a scheme to delay recording data on the basis of a reproduced signal corresponding to the timing compensation pattern of a predetermined width to compensate a phase shift of data recorded onto the magnetic disk resulting from the distance in a running direction between the reproducing head and the recording head. Thus, in a magnetic disk device of the external synchronization system using a head assembly of the recording/reproducing heads separation type, it, is possible to record data at a correct position on the magnetic disk irrespective of the position in a disk radial direction of the recording head. As a result, data reproduction free from error can be carried out.

What is claimed is:

1. An apparatus for recording data onto a disk, and for reproducing data from the disk, the disk having a permanent pattern formed thereon, the apparatus comprising:

a reproducing head for reproducing data from the disk, for detecting the permanent pattern, and for outputting a pattern signal in response to the permanent pattern;

clock signal generating means for generating a clock signal so that a portion of the clock signal is synchronized to a portion of the pattern signal;

delay means for receiving data to be recorded on the disk wherein the data to be recorded on the disk is clocked in response to the clock signal generated by the clock signal generating means, and for delaying the data to be recorded on the disk a delay time relative to the clock signal generated by the clock signal generating means, the delay time including a first delay component and a second delay component;

a recording head for recording the data delayed by the delay means onto the disk;

position detecting means for determining a radial position of the reproducing head over the disk in response to the data reproduced by the reproducing head; and control means for detecting a predetermined magnetization reversal pattern in the data to be recorded, for determining the first delay component in response thereto, and for determining the second delay component in response to the radial position of the reproducing head.

2. The apparatus of claim 1, wherein the second delay component compensates for a phase shift resulting from a distance in a running direction between the reproducing head and the recording head.

3. An apparatus for recording data onto a disk, and for reproducing data from the disk, the disk having a clock pattern formed thereon, the apparatus comprising:

a reproducing head for reproducing data from the disk, for detecting the clock pattern, and for outputting a pattern signal in response to the clock pattern;

clock signal generating means for generating a clock signal synchronized to a portion of the pattern signal, the clock signal generating means updating the phase of a Phase Locked Loop (PLL) so that the rising edge of the clock signal is synchronous with a peak of the pattern signal;

delay means for delaying data to be recorded on the disk a delay time relative to the clock signal generated by the clock signal generating means, the delay time including a first delay component and a second delay component;

a recording head for recording the data delayed by the delay means onto the disk;

position detecting means for detecting a radial position of the reproducing head over the disk in response to the data reproduced by the reproducing head; and control means for detecting a predetermined magnetization reversal pattern in the data to be recorded, for determining the first delay component in response thereto, and for determining the second delay component in response to the radial position of the reproducing head.

4. An apparatus for recording data onto a disk, and for reproducing data from the disk, the disk having a clock pattern formed thereon, the apparatus comprising:

a reproducing head for reproducing data from the disk, for detecting the clock pattern, and for outputting a pattern signal in response to the clock pattern;

clock signal generating means for generating a clock signal synchronized to a portion of the pattern signal;

timing generation means for counting a predetermined number of pulses of the clock signal obtained from the clock signal generating means, and for generating a switching signal each time the predetermined number of pulses are counted, the switching signal indicating a period within which the reproducing head passes over the clock pattern;

delay means for delaying data to be recorded on the disk a first delay time relative to the clock signal, and for delaying the switching signal a second delay time relative to the clock signal, the first delay time having a first delay component and a second delay component, the second delay time having the second delay component;

a recording head for recording the data delayed by the delay means onto the disk;

position detecting means for detecting a radial position of the reproducing head over the disk in response to the data reproduced by the reproducing head; and control means for detecting a predetermined magnetization reversal pattern in the data to be recorded, for determining the first delay component in response thereto, for determining the second delay component in response to the radial position of the reproducing head.

5. An apparatus for recording data onto a disk, and for reproducing data from the disk, the disk having a clock pattern formed thereon, the apparatus comprising:

a reproducing head for reproducing data from the disk, for detecting the clock pattern, and for outputting a pattern signal in response to the clock pattern;

clock signal generating means for generating a clock signal synchronized to a portion of the pattern signal;

delay means for delaying data to be recorded on the disk a delay time relative to the clock signal generated by the clock signal generating means, the delay time including a first delay component and a second delay component;

a recording head for recording the data delayed by the delay means onto the disk;

position detecting means for detecting a radial position of the reproducing head over the disk in response to the data reproduced by the reproducing head; and control means for detecting a predetermined magnetization reversal pattern in the data to be recorded, for determining the first delay component in response thereto, for determining the second delay component in response to the radial position of the reproducing head, the control means comprising:

a phase shift calculating unit for determining a track number from the radial position of the reproducing head, and for calculating the second delay component from the track number, the second delay component compensating for a phase shift resulting from a distance in a running direction between the reproducing head and the recording head, a detecting unit for detecting the predetermined magnetization reversal pattern, a positional shift calculating unit for calculating the first delay component when the detecting unit detects the predetermined pattern, and an adding unit for adding the first delay component and the second delay component.

6. An apparatus for recording data onto a disk, and for reproducing data from the disk, the disk having a clock pattern formed thereon, the apparatus comprising:

a reproducing head for reproducing data from the disk, for detecting the clock pattern, and for outputting a pattern signal in response to the clock pattern;

clock signal generating means for generating a clock signal synchronized to a portion of the pattern signal;

timing generation means for counting a predetermined number of pulses of the clock signal obtained from the clock signal generating means, and for generating a switching signal each time the predetermined number are counted, the switching signal indicating a period within which the reproducing head passes over the clock pattern;

delay means for delaying data to be recorded on the disk a first delay time relative to the clock signal, and for delaying the switching signal a second delay time relative to the clock signal, the first delay time including a first delay component and a second delay component, the second delay time including the second delay component, the delay means comprising:

delay quantity division means for dividing a control signal into an integral delay component and a variable delay component, first delay means for delaying the switching signal by a delay corresponding to the integral delay component, second delay means for delaying the recording data by the delay corresponding to the integral delay component, and third delay means for delaying the delayed recording data by a delay corresponding to the variable delay component;

a recording head for recording the data delayed by the delay means onto the disk;

position detecting means for detecting a radial position of the reproducing head over the disk in response to the data reproduced by the reproducing head; and control means for detecting a predetermined magnetization reversal pattern in the data to be recorded, for determining the first delay component in response thereto, for determining the second delay component in response to the radial position of the reproducing head, and for outputting the control signal by combining the first and second delay components.

7. An apparatus for recording data onto a disk, and for reproducing data from the disk, the disk having a clock pattern and a timing compensation pattern of a predetermined width permanently formed thereon in advance in a disk radial direction, the apparatus comprising:

a reproducing head for reproducing data, the clock pattern, and the timing compensation pattern from the disk, and for outputting a reproduced signal in response to the data, the clock pattern, and the timing compensation pattern, the reproduced signal having a first peak and a first trough that correspond to a first portion and a second portion, respectively, of the clock pattern, and a second peak and a second trough, respectively, that correspond to a first portion and a second portion, respectively, of the timing compensation pattern;

clock signal generating means for generating a clock signal synchronized to the first peak of the reproduced signal;

delay means for receiving data to be recorded on the disk wherein the data to be recorded on the disk is clocked in response to the clock signal generated by the clock signal generating means, and for delaying the data to be recorded on the disk a delay time relative to the clock signal generated by the clock signal generating means;

a recording head for recording data delayed by the delay means onto the disk; and control means for determining the delay time so as to compensate for a delay corresponding to a difference between the second peak and the second trough of the timing compensation pattern reproduced by the reproducing head, and so as to compensate for a positional shift of reversal of magnetization resulting from a pattern where the magnetization reversal interval of recording data becomes minimum.

8. The apparatus of claim 7 wherein the reproducing head and the recording head are separated by a separation distance, and wherein the predetermined width of the timing compensation pattern is substantially equal to the separation distance.

9. An apparatus for recording data onto a disk, and for reproducing data from the disk, the disk having a clock pattern formed thereon, the apparatus comprising:

a reproducing head for reproducing data from the disk, for detecting the clock pattern, and for outputting a pattern signal in response to the clock pattern;

clock signal generating means for generating a clock signal and for updating the phase of the clock signal so that the rising edge of the clock signal becomes synchronous with a peak of the pattern signal;

timing generating means for counting the number of pulses of the clock signal obtained from the clock signal generating means to thereby generate a switching signal for carrying out switching between a recording mode and a reproducing mode;

delay means for receiving data to be recorded on the disk wherein the data to be recorded on the disk is clocked in response to the clock signal generated by the clock signal generating means, and for delaying the data to be recorded on the disk a first delay time relative to the clock signal, and for delaying the switching signal a second delay time relative to the clock signal, the first delay time having a first delay component and a second delay component, the second delay time having the second delay component;

a recording head for recording the data delayed by the delay means onto the disk in synchronism with the delayed switching signal;

position detecting means for determining a radial position of the reproducing head over the disk in response to the data reproduced by the reproducing head; and control means for determining the second delay component so as to compensate for a phase shift resulting from a distance in a running direction between the reproducing head and the recording head, and the first delay component so as to compensate for a positional shift of reversal of magnetization resulting from a pattern where the magnetization reversal interval of recording data becomes minimum.

* * * * *